United States Patent
Neelakantan et al.

(10) Patent No.: US 8,608,618 B1
(45) Date of Patent: Dec. 17, 2013

(54) METHOD OF ELIMINATING TORQUE INTERRUPTION DURING MODE SHIFT

(75) Inventors: Vijay A. Neelakantan, Rochester Hills, MI (US); Andrew W. Phillips, Rochester, MI (US); Zhe Xie, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/555,856

(22) Filed: Jul. 23, 2012

(51) Int. Cl.
*B60W 10/04* (2006.01)

(52) U.S. Cl.
USPC .......................................................... 477/41

(58) Field of Classification Search
USPC ..................... 475/209, 214; 476/33
See application file for complete search history.

(56) References Cited

U.S. PATENT DOCUMENTS

| | | | |
|---|---|---|---|
| 6,875,152 B2 * | 4/2005 | Iwatuki et al. | 477/44 |
| 8,353,799 B2 * | 1/2013 | Takahashi et al. | 475/208 |
| 8,414,441 B2 * | 4/2013 | Ogawa et al. | 475/196 |
| 2013/0196805 A1 * | 8/2013 | Phillips | 475/5 |

* cited by examiner

*Primary Examiner* — Dirk Wright

(57) ABSTRACT

In a multiple mode continuously variable transmission having a variator, a planetary gear assembly, a low mode brake that grounds a first component of the planetary gear assembly to provide lower operating speeds and a high mode brake that grounds a second component of the planetary gear assembly to provide higher operating speeds, the method of providing a mode upshift comprising the steps of adjusting the ratio of the variator from a low ratio to a high ratio, releasing the low mode brake while simultaneously engaging the high mode brake during a torque phase of the shift and reducing the variator ratio from a high ratio to a low ratio during the inertia phase of the shift, thereby eliminating torque interruption and providing a constant torque output.

17 Claims, 2 Drawing Sheets

METHOD OF ELIMINATING TORQUE INTERRUPTION DURING MODE SHIFT

FIELD

The present disclosure relates to multiple mode continuously variable transmissions (CVT's) and more particularly to a method of operating a multiple mode continuously variable transmission which eliminates torque interruption during a mode shift.

BACKGROUND

The statements in this section merely provide background information related to the present disclosure and may or may not constitute prior art.

Continuously variable transmissions provide smooth, stepless power transfer to the final drive assembly of a motor vehicle. They are thus attractive to drivers not only because they eliminate conventional gear shifts but also because they are capable of closely matching the engine speed and torque to the vehicle load thereby improving both performance and fuel economy.

They are not without drawbacks, however, the most significant generally being their somewhat limited input to output speed ratio range. Whereas a multiple gear (conventional) transmission can be equipped with any number of forward gears, commonly now, six, seven or eight, to provide any desired input to output ratio range, continuously variable transmissions do not generally enjoy this open ended capability.

Accordingly, in many applications, a basic continuously variable device such as a variator is teamed with one or more gear trains and engagement (selection) devices such as clutches to provide one or more additional speed (gear) ratios to augment the speed ratio range of the variator. A consequence of such additional transmission components is that whereas the output of the variator is smooth and shiftless, an operational feel to which the vehicle operator becomes accustomed, such additional shift components often provide dramatic ratio changes while the variator adjusts or resets from a low ratio (high speed range) to a high ratio (low speed range). Such ratio changes are difficult to achieve without an interruption of torque delivery to the final drive assembly and thus difficult to achieve without being sensed by the driver and passengers.

The present invention is directed to solving this problem and providing smooth and virtually undetectable mode shifts in a multiple mode continuously variable transmission.

SUMMARY

The present invention is a method of providing improved mode shifts in a multiple mode continuously variable transmission by eliminating torque interruption during a mode shift. The transmission includes a variator, a planetary gear assembly, a low mode brake (clutch) that cooperates with the planetary gear assembly to provide the lower operating speeds (higher gear ratio) and a high mode brake (clutch) that cooperates with the planetary gear assembly to provide the higher operating speeds (lower gear ratio). However, it should be noted that the two brakes could be replaced by rotating clutches at different locations for different powerflow configurations. Mode shifts in multiple mode continuously variable transmissions are generally characterized as having two phases: a first or torque phase and a second or inertia phase. During the torque phase of a mode upshift from the low mode to the high mode, the ratio of the variator is adjusted from a low ratio to a high ratio and the low mode brake (clutch) is released while the high mode brake (clutch) is simultaneously engaged. During the inertia phase, the variator ratio is reduced from the high ratio to a low ratio, providing a constant torque output and eliminating torque interruption or a torque hole.

Thus it is an aspect of the present invention to provide a method of operating a multiple mode continuously variable transmission.

It is a further aspect of the present invention to provide a method of operating a multiple mode continuously variable transmission having a low mode and a high mode.

It is a still further aspect of the present invention to provide a method of operating a multiple mode continuously variable transmission having shifts defining a torque phase and an inertia phase.

It is a still further aspect of the present invention to provide a method of operating a multiple mode continuously variable transmission having a variator, a planetary gear assembly, a low mode brake (clutch) and a high mode brake (clutch).

It is a still further aspect of the present invention to provide a method of operating a multiple mode continuously variable transmission including increasing the ratio of the variator during the torque phase of a shift.

It is a still further aspect of the present invention to provide a method of operating a multiple mode continuously variable transmission including releasing a low mode brake while engaging a high mode brake during the torque phase of a shift.

It is a still further aspect of the present invention to provide a method of operating a multiple mode continuously variable transmission including reducing the ratio of the variator during the inertia phase of a shift.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 3:
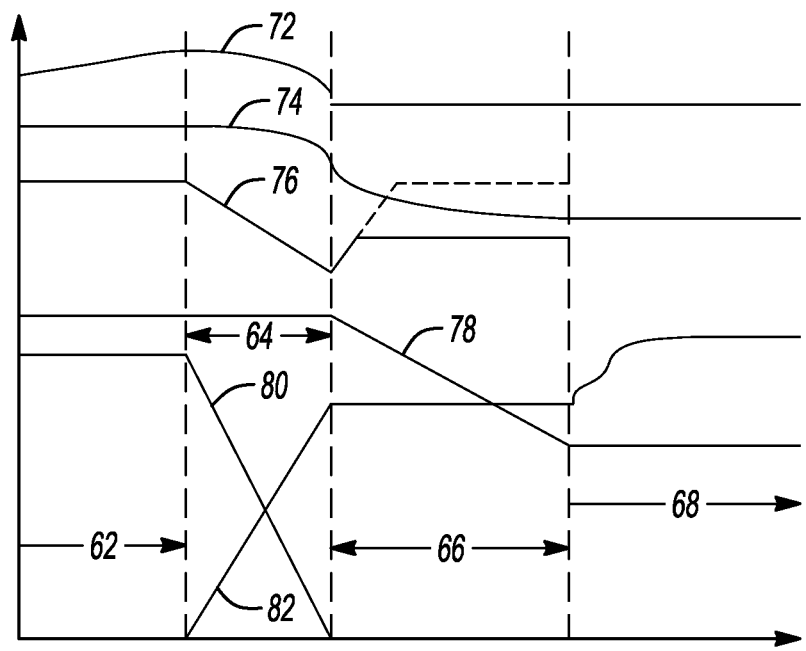
Figure 4:
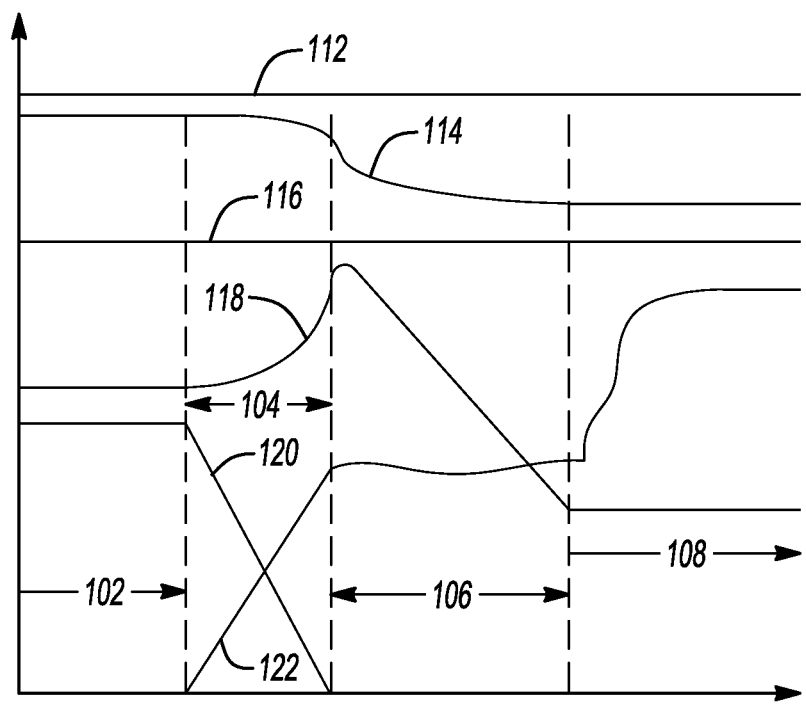

FIG. 3 is a graph presenting several operating parameters of a prior art, multiple mode continuously variable transmission having an undesirable torque interruption (hole) during a mode shift; and FIG. 4 is a graph presenting several operating parameters of a multiple mode continuously variable transmission operating according to the method of the present invention having no torque interruption (hole) during a mode shift.

DETAILED DESCRIPTION

The following description is merely exemplary in nature and is not intended to limit the present disclosure, application, or uses.

Figure 1:
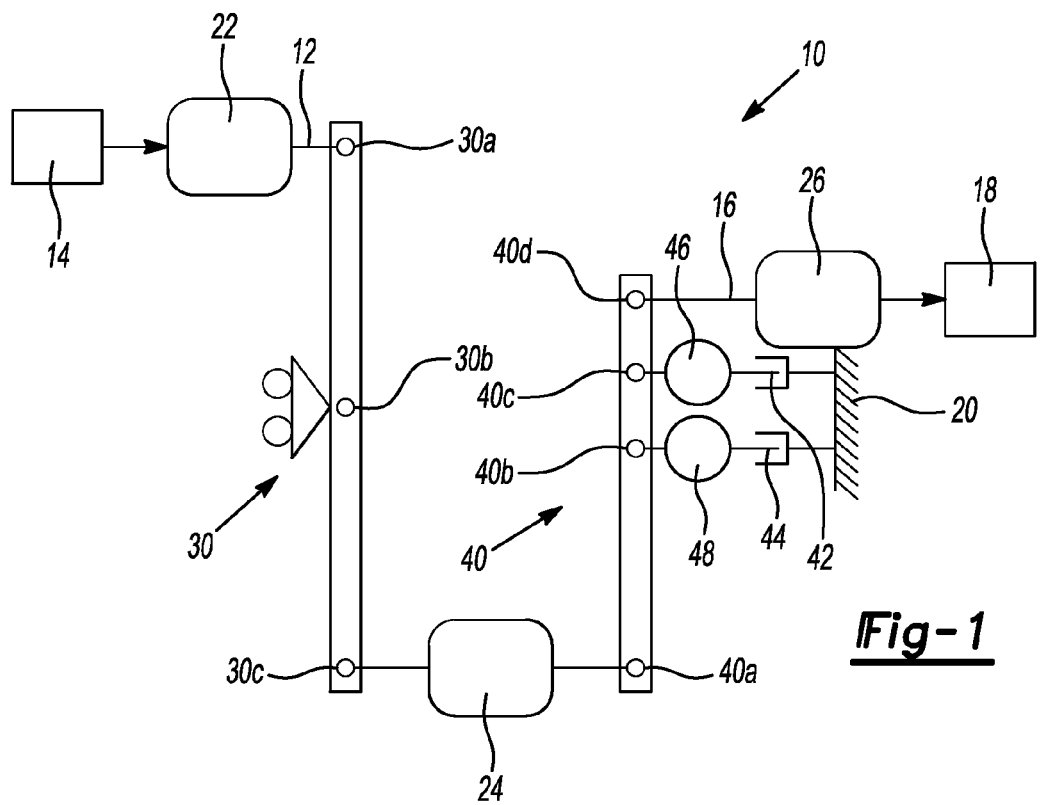
FIG. 1 is a lever diagram of a multiple mode continuously variable transmission incorporating and operable according to the method of the present invention.

With reference to FIG. 1, a multiple mode, continuously variable automatic transmission is illustrated in a lever diagram and designated by the reference number 10. A lever diagram is a schematic representation of the components of an automatic transmission wherein a planetary gear assembly is represented by a vertical bar or lever and the components of the planetary gear assembly such as the sun gear, the planet gear carrier and the ring gear are represented by nodes. The relative lengths of the vertical bars between the nodes represent the ratios between the components. In the case of the variable ratio component, referred to as a "variator," it includes an input node, an output node and a moveable pivot point representing the adjustable speed ratio which it provides. Mechanical couplings or interconnections between the nodes such as shafts or quills are represented by horizontal lines and torque transmitting devices such as friction brakes (clutches) are represented by interleaved or nested fingers. The inertia of various components is represented by ovals and circles. Further explanation of the format, purpose and use of lever diagrams can be found in SAE Paper No. 810102 entitled, "The Lever Analogy: A New Tool in Transmission Analysis" by Benford and Leising which is fully incorporated herein by reference.

The automatic transmission 10 includes an input shaft 12 which typically will be coupled to and driven by a prime mover 14 such as a gasoline, Diesel, flex fuel or hybrid engine or power plant, an output shaft 16 which will typically be coupled to and drive a final drive assembly 18 including a differential, axles, wheels and tires. The components of the automatic transmission 10 are located, secured and protected within a cast metal housing 20 which is referred to as "ground" with reference to FIG. 1.

Because it is significant with regard to the operation of the transmission 10, the lever diagram of FIG. 1 also indicates the location of various inertial features. A first quantum of inertia is the inertia 22 residing in the input shaft 12 and associated components. A second quantum of inertia 24 resides in a variator 30 and a third quantum of inertia 26 resides in the output shaft 16 and final drive assembly 18.

The automatic transmission 10 also includes the variator 30, that is, a mechanical device capable of providing a continuously variable input to output speed ratio over a limited range, which includes a first node 30A which is coupled to and driven by the input shaft 12, a second node 30B having a variable or moveable position which represents the instantaneous ratio provided by the variator 30 and a third node 30C which functions as the output of the variator 30.

The third node 30C, the output of the variator 30 is coupled to and drives a first node 40A of a four node lever 40. The four node lever 40 also includes a second node 40B, and third node 40C and a fourth node 40D which is coupled to and drives the output shaft 16 and the final drive assembly 18. A first torque transmitting device 42, such as a friction brake, selectively connects the third node 40C to ground, i.e., the stationary housing 20, to provide a first or low speed range for the transmission 10 and a second torque transmitting device 44, such as a friction brake, selectively connects the second node 40B to ground, i.e., the stationary housing 20, to provide a second or high speed range for the transmission 10. Alternatively, it should be understood that the torque transmitting devices 42 and 44, may be friction clutches and thus have both input and output connected to rotatable members or be a combination of one friction brake and one friction clutch. The torque transmitting friction brakes 42 and 44, which, as noted may also be friction clutches, typically include a first and a second set of interleaved friction plates or discs and an electric or hydraulic operator (not illustrated). The first set of plates or discs are connected to, for example, an input member and the second set of plates or discs are connected to, for example, ground or an output member.

In an actual transmission 10, the four node lever 40 will take the form of a pair of planetary gear assemblies (not illustrated) each assembly having a sun gear, a plurality of planet gears mounted in a planet gear carrier and a ring gear. Four of these elements are coupled in pairs by two fixed interconnections such as shafts, quills or common construction to define the four distinct nodes: 40A, the input, 40B and 40C, connected to the torque transmitting devices 44 and 42, respectively, and 40D, the output.

Figure 2:
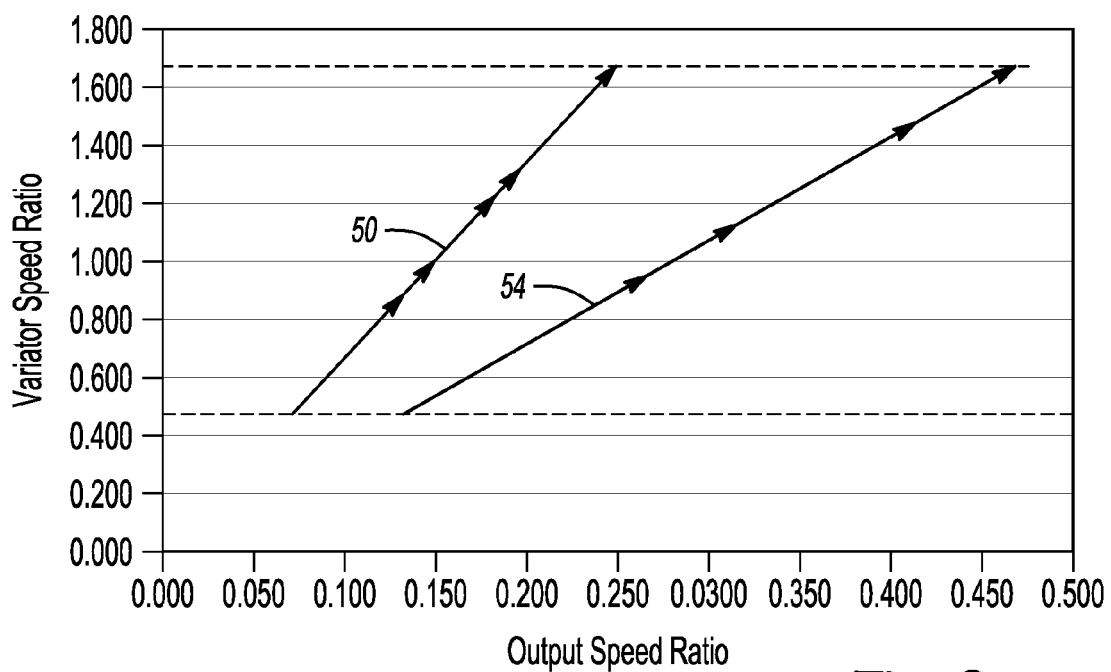
FIG. 2 is a graph presenting operating parameters, namely variator speed ratio on the ordinate (Y) axis and output speed ratios on the abscissa (X) axis, of a typical multiple mode continuously variable transmission of the prior art.

Referring now to FIG. 2, the graph represents operating parameters, namely variator speed ratios on the ordinate (Y axis) and input to output transmission speed ratios on the abscissa (X axis), of a typical multiple mode continuously variable transmission. The line 50 represents the performance of the low mode, i.e., lower speeds and higher overall gear ratio, of a typical multiple mode continuously variable speed transmission. Note that a typical variator speed ratio varies from approximately 0.47 to 1.68. The range of output speed ratios of such a typical transmission will then be from approximately 0.07 to 0.245 which converts to approximately 1 to 3.5.

It will be appreciated that the numerical span of this ratio (1 to 3.5) is insufficient to provide suitable operation in most motor vehicles. Accordingly, a typical and exemplary variator is teamed with one or more gear trains and engagement (selection) devices such as clutches or brakes, as noted above, to provide one or more additional speed (gear) ratios to augment the limited speed ratio range of the variator. The line 54 represents the performance of the high mode, i.e., higher speeds and lower overall gear ratio, of a typical multiple mode continuously variable speed transmission. FIG. 2 thus makes clear the fact that while in the high mode, although the variator again provides only the variable speed ratios from approximately 0.47 to 1.68, the addition of the high mode extends the upper limit of the input to output speed ratio of the transmission to approximately 0.465. Thus, the input to output ratio range of a typical and exemplary two mode continuously variable transmission is from approximately 0.07 to 0.465 which converts to approximately 1 to 6.64 which provides a wider and more suitable speed ratio range for a motor vehicle transmission especially for passenger cars and light trucks.

Referring now to FIG. 3, a graph presents several variables relating to a mode upshift by a prior art multiple mode continuously variable transmission that undergoes a torque interruption (hole). The graph presents time on the abscissa (X axis) which is divided into four regions: a pre-shift phase 62, a torque phase 64, an inertia phase 66 and a post shift phase 68. The torque phase 64 is generally defined as that portion of a shift in which one of the clutches or brakes of a multiple mode continuously variable transmission relaxes and ceases to carry torque while another of the clutches or brakes simultaneously engages and carries torque. The inertia phase 66 is generally defined as that portion of the shift in which the inertia of the components of the powertrain affect and have an impact on the shift.

The first or uppermost plot 72 presents the relative magnitude of the speed of the vehicle which increases during the pre-shift phase 62, decreases at an increasing rate during the torque phase 64 and then remains constant during the inertia phase 66 and the post shift phase 68. The second plot 74 presents the engine speed which is constant during the pre-shift phase 62, decreases at an increasing rate during the torque phase 64, continues to decrease but at a decreasing rate during the inertia phase 66 and is essentially constant during the post shift phase 68. The third plot 76 is the output torque which is constant during the pre-shift phase 62, decreases linearly during the torque phase 64, increases momentarily and linearly at the beginning of the inertia phase 66 and is constant during the post shift phase 68. This reduction in output torque during the torque phase 64 is the torque interruption discussed above which can be detected by the vehicle operator, is considered to be highly undesirable and is the problem addressed by the present invention.

The fourth plot 78 is the variator ratio which is constant throughout the pre-shift and torque phases 62 and 64, drops linearly during the inertia phase 66 and is constant during the post shift phase 68. The fifth plot 80 is the engagement of the low mode friction brake 42 which is fully engaged during the pre-shift phase 62, changes linearly from fully engaged to fully disengaged during the torque phase 64 and remains fully disengaged throughout the inertia and post shift phases 66 and 68. The sixth or lowermost plot 82 is the engagement of the high mode friction brake 44 which is fully disengaged during the pre-shift phase 62, changes linearly from fully disengaged to partially engaged during the torque phase 64 and remains partially engaged during the inertia phase 66 and becomes fully engaged during the post shift phase 68.

Several equations address and clarify the distinctions between a prior art method and the operating method of the present invention. As explained above with regard to FIG. 2, the dual mode configuration of the transmission 10 and the interaction of the variator 30 with the first brake 42 and the second brake 44, which provides the two speed ranges of the transmission 10, can be expressed by the equations:

$$\Omega_{vo} - (1+r_H)\Omega_{J_H} + r_H\Omega_o = 0$$

$$\Omega_{vo} - (1+r_L)\Omega_{J_L} + r_L\Omega_o = 0$$

where
$\Omega_{vo}$ is the output speed of the variator,
$r_H$ is the ratio provided by the second brake (clutch),
$\Omega_{J_H}$ is the speed of the inertial components of the second brake,
$\Omega_o$ is the speed of the output of the transmission,
$r_L$ is the ratio provided by the first brake (clutch), and
$\Omega_{J_L}$ is the speed of the inertial components of the first brake.

The mode upshift itself, in which the lower gear or first brake (higher speed reduction) is disengaged and the higher gear or second brake (lower speed reduction) is engaged is expressed by the equation:

$$J_o \dot{\Omega}_o = \left( T_H \left( \frac{r_H}{1+r_H} \right) + T_L \left( \frac{r_L}{1+r_L} \right) \right) + T_{load}$$

where
$J_o$ is the inertia of the output components,
$\dot{\Omega}_o$ is the rate of change of speed of the transmission output,
$T_H$ is the torque through the oncoming (high mode) brake,
$T_L$ is the torque through the relaxing (low mode) brake, and
$T_{load}$ is the torque of the load (vehicle).

The dynamic relationship between these variables and the product of the rate of change of the input to output ratio of the variator times the output speed of the variator is expressed by the equation:

$$\dot{R}\Omega_{vo} = \frac{T_{in}}{J_{in}} + \dot{\Omega}_o \left( \frac{J_o}{J_{in}Rr_H} + \frac{r_L(J_{vo} + R^2 J_{in})}{J_{in}R} \right) - \frac{T_{load}}{J_{in}Rr_H} - \frac{\lambda_4(r_H - r_L)}{(1+r_L)J_{in}Rr_H}$$

where
$\dot{R}$ is the rate of change of the input to output ratio of the variator,
$\Omega_{vo}$ is the output speed of the variator,
$T_{in}$ is the torque delivered to the input of the transmission,
$J_{in}$ is the inertia of the input components,
$R$ is the input to output ratio of the variator,
$J_{vo}$ is the inertia of the variator output components, and
$\lambda_4$ is the torque capacity of the relaxing (low mode) brake.

Accordingly, if $\dot{R}=0$, meaning that the left-most term is also equal to zero, the above equation can be reduced to $$\alpha \dot{\Omega}_0 = -T_{in}\beta + T_{off}\gamma \Rightarrow \dot{\Omega}_0 < 0$$

where
$\alpha$, $\beta$ and $\gamma$ are simplifications of the above terms. The net result, namely that $\dot{\Omega} < 0$, means that during the torque phase, the speed of the vehicle will be dropping and this speed reduction will be detected by the vehicle operator and considered to be undesirable.

Referring now to FIG. 4, a graph presents several variables relating to a mode upshift by a multiple mode continuously variable transmission 10 operating according to the present invention that provides a smooth inter-mode upshift without torque interruption (a hole). Again, the graph presents time on the abscissa (X axis) which is divided into four regions: a pre-shift phase 102, a torque phase 104, an inertia phase 106 and a post shift phase 108. The first or uppermost plot 112 presents the relative magnitude of the speed of the vehicle which remains constant during the pre-shift phase 102, the torque phase 104, the inertia phase 106 and the post shift phase 108. The second plot 114 presents the speed of the engine 14 which is constant during the pre-shift phase 102, decreases during the torque phase 104 at an increasing rate, continues to decrease at a decreasing rate during the inertia phase 106 and is essentially constant during the post shift phase 108. The third plot 116 is the output torque which is constant throughout the pre-shift phase 102, the torque phase 104, the inertia phase 106 and the post shift phase 108.

The fourth plot 118 is the ratio of the variator 30 which is constant throughout the pre-shift phase 102, increases at an increasing rate during the torque phase 104, peaks near the beginning of the inertia phase 106 and then decreases linearly and is constant during the post shift phase 108. Note that a complete change of the ratio of the variator 30 can occur during the inertia phase 106. The fifth plot 120 is the engagement of the low mode friction brake 42 which is fully engaged during the pre-shift phase 102, changes linearly from fully engaged to fully disengaged during the torque phase 104 and remains fully disengaged throughout the inertia and post shift phases 106 and 108. The sixth or lowermost plot 122 is the engagement of the high mode friction brake 44 which is fully disengaged during the pre-shift phase 102, changes linearly from fully disengaged to partially engaged during the torque phase 104 and remains partially engaged during the inertia phase 106 and becomes fully engaged during the post shift phase 108.

The variability of the plot 122 of FIG. 4 clarifies that the engagement of the high mode friction brake 44 may by modulated to maintain output torque, plot 116, at a constant value, to further improve operation and reduce or eliminate any torque interruption during an inter-mode shift. Finally, the torque output of the engine 14 may also be modulated, if desired, again as an additional measure of improving an inter-mode shift.

The first four equations presented in the above paragraphs, of course, apply as well to the two mode transmission 10 illustrated in FIG. 1 which functions according to the present inventive method. Thus, they will not be repeated here but are here fully incorporated by reference. The differences and improvements arise with regard to the fifth (and last) equation appearing above. In this instance, rather than setting $\dot{R}$ (the rate of change of the variator 30 input to output ratio) equal to zero, meaning that the ratio of variator 30 does not change during the torque phase, $\dot{\Omega}_o$, the rate of change of the speed of the vehicle is set equal to zero. This operational characteristic is, of course, highly desirable because it means that there will not be a speed decrease during the shift which is sensed as a torque interruption or hole which is very undesirable. With $\dot{\Omega}_o$ equal to zero, the equation becomes $$\dot{R}\Omega_{vo} = \left(\frac{T_{onc}(r_L - r_H)}{(1 + r_H)r_L J_{in} R}\right) \Rightarrow \dot{R} = \text{positive}$$

and thus the rate of change of the ratio of the variator 30 is and must be positive if the output speed $\Omega_o$ is to remain constant. By changing the ratio of the variator 30 during the torque phase 104 and thereby maintaining the speed of the vehicle, there is no discernible torque interruption. As noted above, if desired, both the engagement of the high mode brake 44 and torque output of the engine 12 may be modulated to further reduce any sensible torque interruption. Accordingly, both vehicle performance and operator satisfaction are improved.

The description of the invention is merely exemplary in nature and variations that do not depart from the gist of the invention are intended to be within the scope of the invention. Such variations are not to be regarded as a departure from the spirit and scope of the invention.

What is claimed is:

1. A method of operating a multiple mode continuously variable transmission comprising the steps of:
   providing a transmission having a variator, a planetary gear assembly and at least two torque transmitting devices associated with said planetary gear assembly for providing two distinct gear ratios,
   engaging one of said torque transmitting devices and adjusting said variator from a higher ratio to a lower ratio,
   performing a mode upshift by engaging another of said torque transmitting devices while disengaging said one of said torque transmitting devices and simultaneously adjusting said variator from said lower ratio to another, higher ratio.

2. The method of operating a multiple mode continuously variable transmission of claim 1 wherein said step of adjusting said variator from a higher ratio to a lower ratio is undertaken as a speed of a vehicle increases.

3. The method of operating a multiple mode continuously variable transmission of claim 1 wherein planetary gear assembly provides both a first, higher gear ratio and a second, lower gear ratio.

4. The method of operating a multiple mode continuously variable transmission of claim 1 further including the step of modulating engagement of said another of said torque transmitting devices.

5. The method of operating a multiple mode continuously variable transmission of claim 1 further including the steps of providing an engine and modulating a torque output of said engine during said mode upshift.

6. The method of operating a multiple mode continuously variable transmission of claim 1 wherein a ratio of said variator is adjusted from said higher ratio to a second, lower ratio while modulating engagement of said another of said torque transmitting devices.

7. The method of operating a multiple mode continuously variable transmission of claim 1 further including the steps of providing a transmission housing and coupling one member of said torque transmitting devices to said planetary gear assembly and another member to said transmission housing.

8. A method of operating a multiple mode continuously variable transmission comprising the steps of:
   providing a transmission having a variator, a planetary gear assembly including a first planetary gear set and a second planetary gear set and at least two torque transmitting devices associated with said planetary gear assembly for providing two distinct gear ratios,
   engaging one of said torque transmitting devices and adjusting said variator from a higher ratio to a lower ratio,
   during a torque phase of a shift: engaging another of said torque transmitting devices, disengaging said one of said torque transmitting devices and adjusting said variator from said lower ratio to another, higher ratio, thereby eliminating a drop in torque output, and
   during an inertia phase of said shift, adjusting said variator from said another, higher to a second, lower ratio.

9. The method of operating a multiple mode continuously variable transmission of claim 8 wherein a ratio of said variator is adjusted from said higher ratio to a second, lower ratio while modulating engagement of said another of said torque transmitting devices.

10. The method of operating a multiple mode continuously variable transmission of claim 8 further including the steps of providing a transmission housing and coupling one member of said torque transmitting devices to said planetary gear assembly and another member to said transmission housing.

11. The method of operating a multiple mode continuously variable transmission of claim 8 wherein said step of adjusting said variator from a higher ratio to a lower ratio is undertaken as a speed of a vehicle increases.

12. The method of operating a multiple mode continuously variable transmission of claim 8 wherein planetary gear assembly provides both a first, higher gear ratio and a second, lower gear ratio.

13. The method of operating a multiple mode continuously variable transmission of claim 8 further including the steps of providing an engine and modulating a torque output of said engine during said mode upshift.

14. A method of performing a mode upshift having a torque phase and an inertia phase in a multiple mode continuously variable transmission, comprising the steps of:
   providing a transmission having a variator, a planetary gear assembly including a first planetary gear set and a second planetary gear set and at least two torque transmitting devices associated with said planetary gear assembly for providing two distinct gear ratios,
   during said torque phase of said shift, disengaging one of said torque transmitting devices and engaging another of said torque transmitting devices to shift said transmission form a low mode to a high mode while adjusting said variator from a lower ratio to a higher ratio, thereby eliminating a drop in output torque, and
   during said inertia phase of said shift, adjusting said variator from said higher ratio to a second, lower ratio.

15. The method of performing a mode upshift in the multiple mode continuously variable transmission of claim 14 further including the steps of providing a transmission housing and coupling one member of said torque transmitting devices to said planetary gear assembly and another member of said torque transmitting devices to said transmission housing.

16. The method of performing a mode upshift in the multiple mode continuously variable transmission of claim 14 wherein a ratio of said variator is adjusted from said higher ratio to a second, lower ratio while modulating engagement of said another of said torque transmitting devices.

17. The method of performing a mode upshift in the multiple mode continuously variable transmission of claim 14 wherein said torque transmitting devices function as friction brakes.

* * * * *